(12) United States Patent
Hamazaki et al.

(10) Patent No.: US 11,986,812 B2
(45) Date of Patent: May 21, 2024

(54) HONEYCOMB STRUCTURE AND ELECTRIC HEATING SUPPORT USING THE HONEYCOMB STRUCTURE

(71) Applicant: NGK INSULATORS, LTD., Nagoya (JP)

(72) Inventors: Makoto Hamazaki, Nagoya (JP); Takayuki Inoue, Nagoya (JP); Kohei Yamada, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/654,406

(22) Filed: Mar. 11, 2022

(65) Prior Publication Data

US 2022/0297105 A1  Sep. 22, 2022

(30) Foreign Application Priority Data

Mar. 19, 2021  (JP) .................. 2021-045377
Jan. 7, 2022   (JP) .................. 2022-001686

(51) Int. Cl.
| | |
|---|---|
| *B01J 35/56* | (2024.01) |
| *B01D 53/94* | (2006.01) |
| *B01J 21/08* | (2006.01) |
| *B01J 27/224* | (2006.01) |

(52) U.S. Cl.
CPC .............. *B01J 35/56* (2024.01); *B01J 21/08* (2013.01); *B01J 27/224* (2013.01); *B01D 53/94* (2013.01); *B01D 2255/9155* (2013.01)

(58) Field of Classification Search
CPC .......... B01J 35/04; B01J 21/08; B01J 27/224; B01D 53/94; B01D 2255/9155; B01D 53/00; B01D 53/34; B01D 53/92; B01D 2255/00; B01D 2255/90; B01D 2255/915; F01N 3/2006; Y02A 50/20; Y02T 10/12; C04B 26/02; C04B 2103/44; C04B 2103/0094; C04B 2103/10; C04B 2103/0079
USPC .................................................. 422/174, 180
See application file for complete search history.

(56) References Cited

U.S. PATENT DOCUMENTS

| | | | |
|---|---|---|---|
| 8,530,030 B2 | 9/2013 | Noguchi et al. | |
| 2006/0234858 A1* | 10/2006 | Ichikawa | B01D 53/9454 502/178 |
| 2012/0183725 A1 | 7/2012 | Noguchi et al. | |
| 2012/0187109 A1 | 7/2012 | Noguchi et al. | |
| 2018/0112575 A1* | 4/2018 | Tsuboi | B01J 35/1033 |
| 2018/0280872 A1* | 10/2018 | Noro | B01J 35/04 |
| 2019/0292104 A1* | 9/2019 | Tsuboi | C04B 38/0009 |

FOREIGN PATENT DOCUMENTS

JP         5735428 B2      6/2015

* cited by examiner

*Primary Examiner* — Natasha E Young
(74) *Attorney, Agent, or Firm* — BURR PATENT LAW, PLLC

(57) ABSTRACT

A honeycomb structure according to at least one embodiment of the present invention includes: partition walls defining cells each extending from a first end surface of the honeycomb structure to a second end surface thereof to form a fluid flow path; and an outer peripheral wall. The partition walls and the outer peripheral wall are each formed of ceramics containing silicon carbide and silicon. A surface of the silicon has formed thereon an oxide film having a thickness of from 0.1 μm to 5.0 μm.

11 Claims, 2 Drawing Sheets

HONEYCOMB STRUCTURE AND ELECTRIC HEATING SUPPORT USING THE HONEYCOMB STRUCTURE

BACKGROUND OF THE INVENTION

This application claims priority under 35 U.S.C. Section 119 to Japanese Patent Application No. 2021-045377 filed on Mar. 19, 2021 and Japanese Patent Application No. 2022-001686 filed on Jan. 7, 2022 which are herein incorporated by reference.

1. Field of the Invention

The present invention relates to a honeycomb structure and an electric heating support using the honeycomb structure.

2. Description of the Related Art

A product, which is obtained by supporting a catalyst on a honeycomb structure that uses cordierite or silicon carbide as its material, is used for treatment of a harmful substance in an exhaust gas emitted from an automobile engine. A typical example of such honeycomb structure is a columnar honeycomb structure having partition walls that demarcate and form a plurality of cells each extending from a first end surface of the honeycomb structure to a second end surface thereof to serve as an exhaust gas flow path. When an exhaust gas is treated with the catalyst supported on the honeycomb structure, a temperature of the catalyst needs to be increased to a predetermined temperature. In this regard, there has been a problem in that, owing to a low temperature of the catalyst at a start of the engine, the exhaust gas is not sufficiently purified. In order to solve such problem, progress is being made in development of a system called an electric heating catalyst (EHC), in which electrodes are arranged on a honeycomb structure formed of a conductive ceramic to cause the honeycomb structure itself to generate heat through energization, to thereby increase the temperature of the catalyst supported on the honeycomb structure to its active temperature before the start of the engine or at the start of the engine.

SUMMARY OF THE INVENTION

The EHC is exposed to a high-temperature oxidizing atmosphere at the time of its use (at the time of the running of an automobile), and hence the blocking of a conduction path and/or the decrease of a conductor may occur to augment an increase in resistance. In addition, the thermal shock resistance of the EHC at high temperature is insufficient in some cases.

A primary object of the present invention is to provide a honeycomb structure excellent in balance between oxidation resistance and thermal shock resistance under a high-temperature environment, and an electric heating support using such honeycomb structure.

A honeycomb structure according to at least one embodiment of the present invention includes: partition walls defining cells each extending from a first end surface of the honeycomb structure to a second end surface thereof to form a fluid flow path; and an outer peripheral wall. The partition walls and the outer peripheral wall are each formed of ceramics containing silicon carbide and silicon.

In at least one embodiment of the present invention, a surface of the silicon has formed thereon an oxide film having a thickness of from 0.1 μm to 5.0 μm.

In at least one embodiment of the present invention, the honeycomb structure has a content of cristobalite of 1.0 mass % or more.

In at least one embodiment of the present invention, the honeycomb structure has a thermal expansion coefficient of from 4.00 ppm/K to 5.30 ppm/K.

In at least one embodiment of the present invention, the thermal expansion coefficient of the honeycomb structure is from 4.00 ppm/K to 4.60 ppm/K.

In at least one embodiment of the present invention, the thermal expansion coefficient of the honeycomb structure is from 4.20 ppm/K to 4.35 ppm/K.

In at least one embodiment of the present invention, the thickness of the oxide film is from 0.1 μm to 0.2 μm, and the honeycomb structure has a thermal expansion coefficient of from 4.20 ppm/K to 4.35 ppm/K.

In at least one embodiment of the present invention, the content of the cristobalite is from 1.5 mass % to 3.5 mass %, and the honeycomb structure has a thermal expansion coefficient of from 4.20 ppm/K to 4.35 ppm/K.

According to another aspect of the present invention, there is provided an electric heating support. The electric heating support includes: the honeycomb structure as described above; a pair of electrode layers arranged on an outer surface of the outer peripheral wall so as to be opposed to each other across a central axis of the honeycomb structure; and a pair of metal terminals connected to the pair of electrode layers.

DESCRIPTION OF THE EMBODIMENTS

Embodiments of the present invention are described below with reference to the drawings. However, the present invention is not limited to these embodiments.

Figure 1:
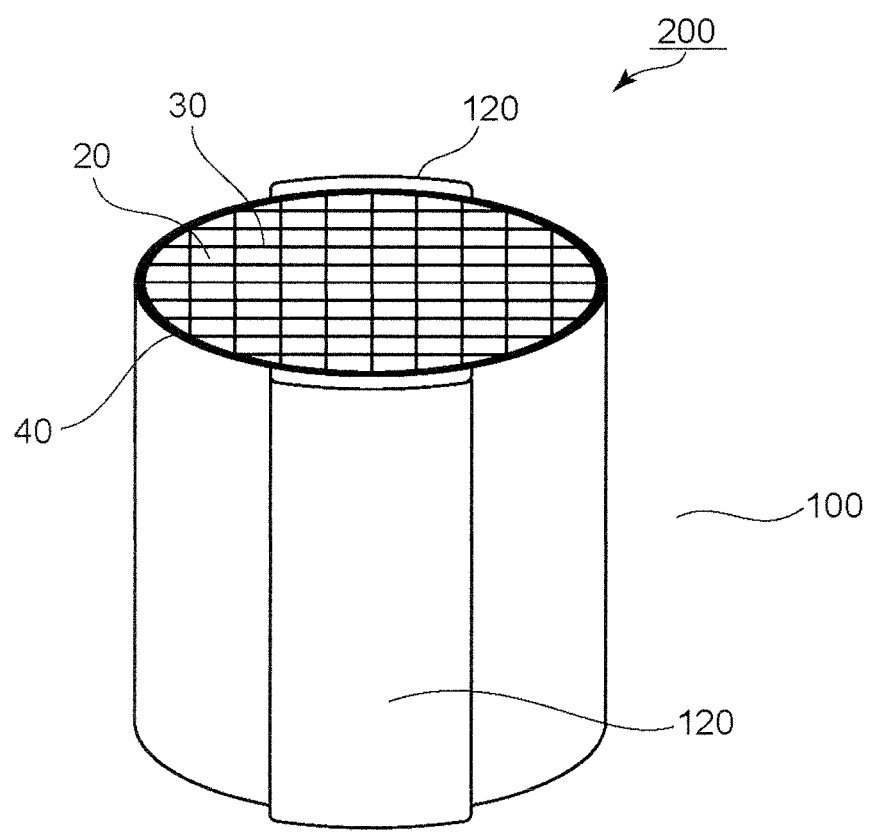
FIG. 1 is a schematic perspective view of an electric heating support including a honeycomb structure according to at least one embodiment of the present invention.
Figure 2:
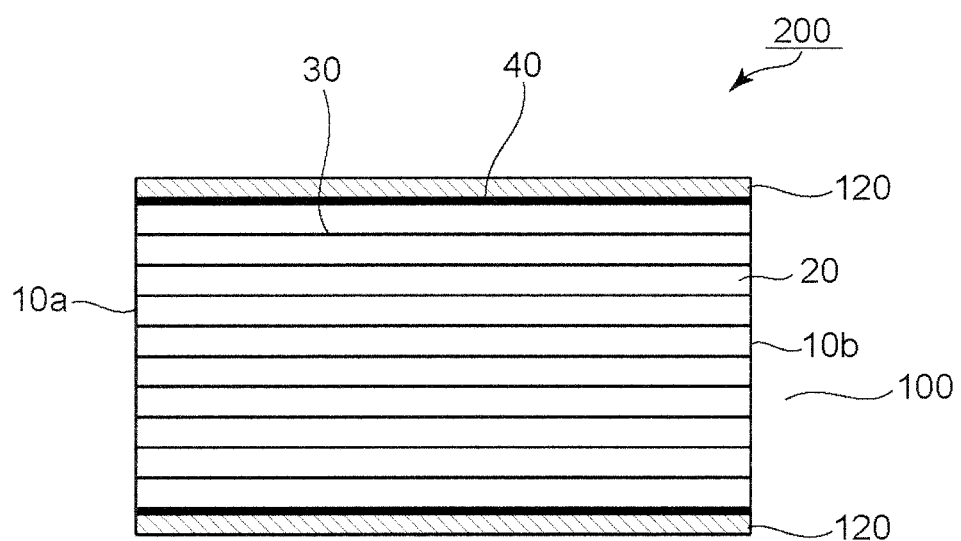
FIG. 2 is a schematic sectional view of the electric heating support of FIG. 1 in a direction parallel to the flow path direction of an exhaust gas.

FIG. 1 is a schematic perspective view of an electric heating support including a honeycomb structure according to at least one embodiment of the present invention, and FIG. 2 is a schematic sectional view of the electric heating support of FIG. 1 in a direction parallel to the flow path direction of an exhaust gas. The honeycomb structure is described first, and the electric heating support is described later in the section B.

A. Honeycomb Structure

A-1. Configuration of Honeycomb Structure

A honeycomb structure 100 of the illustrated example includes partition walls 30 defining cells 20 each extending from a first end surface 10a of the honeycomb structure 100 to a second end surface 10b thereof to form a fluid flow path, and an outer peripheral wall 40. In FIG. 2, a fluid can flow in both left and right directions of the drawing sheet. An example of the fluid is any appropriate liquid or gas in accordance with purposes. For example, when the honeycomb structure is used for an electric heating support to be described later, the fluid is preferably an exhaust gas.

The partition walls 30 and the outer peripheral wall 40 are each formed of ceramics containing silicon carbide and silicon (hereinafter sometimes referred to as "silicon carbide-silicon composite material"). The ceramics contains silicon carbide and silicon at a total of, for example, 90 mass % or more, or for example, 95 mass % or more. With such configuration, the volume resistivity of the honeycomb structure at 25° C. can be allowed to fall within predetermined ranges (for example, from 0.1 Ω·cm to 200 Ω·cm, for example, from 1 Ω·cm to 200 Ω·cm, or for example, from 10 Ω·cm to 100 Ω·cm). As a result, even in the case where, for example, the honeycomb structure is energized with a power source having a high voltage of 200 V or more, an excessive flow of current can be suppressed, and besides, desired heat generation can be achieved by virtue of an appropriate flow of current. The ceramics may contain a substance other than the silicon carbide-silicon composite material. Examples of such substance include aluminum and strontium.

The silicon carbide-silicon composite material typically contains silicon carbide particles serving as aggregates, and silicon serving as a binding material for binding the silicon carbide particles. In the silicon carbide-silicon composite material, for example, a plurality of silicon carbide particles are bound by silicon so as to form pores between the silicon carbide particles. That is, the partition walls 30 and the outer peripheral wall 40 each containing the silicon carbide-silicon composite material may each be, for example, a porous body.

In at least one embodiment of the present invention, an oxide film having a thickness of from 0.1 μm to 5.0 μm is formed on the surface of the silicon. When such oxide film is formed on the silicon surface, a honeycomb structure excellent in balance between oxidation resistance and thermal shock resistance under a high-temperature environment can be achieved. More specifically, an increase in resistance of the honeycomb structure under a high-temperature oxidizing atmosphere can be suppressed, and besides, the thermal expansion rate (thermal expansion coefficient) of the honeycomb structure can be reduced. The thickness of the oxide film is preferably from 0.1 μm to 2.0 μm, more preferably from 0.1 μm to 1.0 μm, still more preferably from 0.1 μm to 0.5 μm, particularly preferably from 0.1 μm to 0.2 μm. When the thickness of the oxide film is set to fall within such ranges, the increase in resistance under a high-temperature oxidizing atmosphere can be further suppressed, and besides, the thermal expansion coefficient can be further reduced. The thickness of the oxide film may be determined from, for example, an image taken with a scanning electron microscope (SEM).

The oxide film may be formed by, for example, subjecting the honeycomb structure to heating treatment (as described later, a predetermined amount or more of cristobalite may also be formed by the heating treatment). A heating temperature in the heating treatment is, for example, 1,300° C. or less, for example, 1,200° C. or less, for example, 1,150° C. or less, for example, 1,100° C. or less, for example, 1,050° C. or less, for example, 1,000° C. or less, or for example, 950° C. or less. Meanwhile, the heating temperature is, for example, 750° C. or more, or for example, 800° C. or more. When the heating temperature falls within such ranges, an oxide film having the above-mentioned predetermined thickness can be formed. As a result, an increase in resistance of the honeycomb structure under a high-temperature oxidizing atmosphere can be suppressed, and besides, the thermal expansion coefficient of the honeycomb structure can be reduced. The heating temperature is preferably set to 1,150° C. or less to make such effects more remarkable. A heating time may vary depending on the heating temperature. For example, when the heating temperature is 1,200° C. or more, the heating time is preferably from 20 minutes to 100 hours, more preferably from 30 minutes to 80 hours, still more preferably from 30 minutes to 40 hours, particularly preferably from 5 hours to 10 hours. For example, when the heating temperature is 1,150° C. or less, the heating time is preferably 1 hour or more, more preferably 5 hours or more, still more preferably 10 hours or more, particularly preferably from 20 hours to 70 hours. When the heating time is excessively long, there may arise a problem in that the thermal expansion coefficient is increased to reduce the thermal shock resistance. When the heating time is excessively short, the oxide film (and/or cristobalite to be described later) is not sufficiently formed in some cases. The heating treatment may be performed under an ambient air atmosphere, or may be performed under a water vapor atmosphere (including, for example, supplying a gas based on nitrogen and adjusted to a water vapor content of from 10 vol % to 30 vol % at the time of the heating treatment). Under the same heating conditions, when the heating treatment is performed under a water vapor atmosphere, an oxide film having a more preferred thickness (and/or a more preferred amount of cristobalite to be described later) can be formed, and hence the effect of suppressing the increase in resistance and the effect of reducing the thermal expansion coefficient can be further promoted.

The oxide film is substantially formed of silicon oxide. The oxide film only needs to be formed on the surface of the silicon serving as the binding material as described above. Accordingly, as well as on the silicon surface, the oxide film may be formed on the surfaces of the silicon carbide particles, and may be formed on any other part in the structure of each of the partition walls and the outer peripheral wall. The oxidation of silicon under a high-temperature environment substantially serves as the main cause of an increase in resistance, and hence, when the predetermined oxide film is formed on the silicon surface of the honeycomb structure in advance, the effect of suppressing the increase in resistance and the effect of reducing the thermal expansion coefficient can be efficiently obtained.

In at least one embodiment of the present invention, the honeycomb structure further/alternatively contains 1.0 mass % or more of cristobalite with respect to the total mass of the honeycomb structure (substantially the partition walls and the outer peripheral wall). When the honeycomb structure contains cristobalite, a honeycomb structure excellent in balance between oxidation resistance and thermal shock resistance under a high-temperature environment can be achieved as well as in the case where the oxide film is formed on the silicon surface. More specifically, an increase in resistance of the honeycomb structure under a high-temperature oxidizing atmosphere can be suppressed, and besides, the thermal expansion coefficient of the honeycomb structure can be reduced. The content of cristobalite is preferably from 1.0 mass % to 7.5 mass %, more preferably from 1.0 mass % to 6.0 mass %, still more preferably from 1.2 mass % to 4.0 mass %, particularly preferably from 1.5 mass % to 3.5 mass %. When the content of cristobalite is set to fall within such ranges, the increase in resistance under a high-temperature oxidizing atmosphere can be further suppressed, and besides, the thermal expansion coefficient can be further reduced. Cristobalite may be typically formed in the oxide film formed by the heating treatment described above. The oxidation of silicon under a high-temperature environment substantially serves as the main cause of an increase in resistance, and hence, when the oxide film including cristobalite is formed on the silicon surface of the honeycomb structure in advance, the effect of suppressing the increase in resistance and the effect of reducing the thermal expansion coefficient can be efficiently obtained. The content of cristobalite may be measured by, for example, an X-ray diffraction method.

The thermal expansion coefficient of the honeycomb structure is, for example, from 4.00 ppm/K to 5.30 ppm/K, preferably from 4.00 ppm/K to 4.75 ppm/K, more preferably from 4.00 ppm/K to 4.60 ppm/K, still more preferably from 4.10 ppm/K to 4.50 ppm/K, particularly preferably from 4.20 ppm/K to 4.35 ppm/K. According to at least one embodiment of the present invention, such thermal expansion coefficient can be achieved by forming the oxide film on the silicon surface and/or allowing the honeycomb structure to contain the predetermined amount or more of cristobalite. As a result, a honeycomb structure having excellent thermal shock resistance can be achieved. For example, a honeycomb structure having high thermal shock resistance in a heating-cooling endurance test (involving switching between a specified temperature of 825° C. or more and an environment of 100° C.) can be achieved.

The strength/Young's modulus ratio σ/E of the honeycomb structure is preferably 0.40 or more, more preferably from 0.45 to 0.90, still more preferably from 0.65 to 0.85. According to at least one embodiment of the present invention, such strength/Young's modulus ratio σ/E can be achieved by forming the oxide film on the silicon surface and/or allowing the honeycomb structure to contain the predetermined amount or more of cristobalite. As a result, a honeycomb structure having excellent thermal shock resistance can be achieved. The Young's modulus E may be measured in conformity with JIS R1602, and the strength σ is typically four-point bending strength that may be measured in conformity with JIS R1601.

Now, a typical configuration of the honeycomb structure is described.

The shape of the honeycomb structure may be appropriately designed in accordance with purposes. The honeycomb structure 100 of the illustrated example has a cylindrical shape (whose sectional shape in a direction perpendicular to a direction in which the cells extend is circular), but the honeycomb structure may have a columnar shape whose sectional shape is, for example, an oval shape or a polygon (e.g., a tetragon, a pentagon, a hexagon, a heptagon, or an octagon). The length of the honeycomb structure may be appropriately set in accordance with purposes. The length of the honeycomb structure may be, for example, from 5 mm to 250 mm, may be, for example, from 10 mm to 150 mm, or may be, for example, from 20 mm to 100 mm. The diameter of the honeycomb structure may be appropriately set in accordance with purposes. The diameter of the honeycomb structure may be, for example, from 20 mm to 200 mm, or may be, for example, from 30 mm to 100 mm. When the sectional shape of the honeycomb structure is not circular, the diameter of the maximum inscribed circle inscribed in the sectional shape (e.g., polygon) of the honeycomb structure may be adopted as the diameter of the honeycomb structure.

As described above, the partition walls 30 and the outer peripheral wall 40 may each be a porous body containing the silicon carbide-silicon composite material. The content of silicon in the silicon carbide-silicon composite material is preferably from 10 mass % to 40 mass %, more preferably from 15 mass % to 35 mass %. When the content of silicon is 10 mass % or more, the strength of the honeycomb structure becomes sufficient. When the content of silicon is 40 mass % or less, the shape of the honeycomb structure can be retained with sufficient accuracy at the time of its firing.

The average particle diameter of the silicon carbide particles is preferably from 3 μm to 50 μm, more preferably from 3 μm to 40 μm, still more preferably from 10 μm to 35 μm. When the average particle diameter of the silicon carbide particles falls within such ranges, the volume resistivity of the honeycomb structure can be allowed to fall within such appropriate ranges as described above. The average particle diameter of the silicon carbide particles may be measured by, for example, a laser diffraction method.

The average pore diameter of each of the partition walls 30 and the outer peripheral wall 40 is preferably from 2 μm to 20 μm, more preferably from 2 μm to 15 μm, still more preferably from 4 μm to 8 μm. When the average pore diameter of the partition walls falls within such ranges, the volume resistivity can be allowed to fall within the above-mentioned appropriate ranges. The average pore diameter may be measured with, for example, a mercury porosimeter.

The porosity of each of the partition walls 30 and the outer peripheral wall 40 is preferably from 30% to 60%, more preferably from 35% to 45%. When the porosity is 30% or more, the deformation of the honeycomb structure at the time of its firing can be sufficiently suppressed. When the porosity is 60% or less, the strength of the honeycomb structure becomes sufficient. The porosity may be measured with, for example, a mercury porosimeter.

The thickness of each of the partition walls 30 may be appropriately set in accordance with purposes. The thickness of each of the partition walls 30 may be, for example, from 50 μm to 0.3 mm, or may be, for example, from 150 μm to 250 μm. When the thickness of each of the partition walls falls within such ranges, the mechanical strength of the honeycomb structure can be made sufficient, and besides, an opening area (total area of cells in a section) can be made sufficient, with the result that pressure loss at the time of the flowing of an exhaust gas in the case of using the honeycomb structure as a catalyst support can be suppressed.

The density of each of the partition walls 30 may be appropriately set in accordance with purposes. The density of each of the partition walls 30 may be, for example, from 0.5 g/cm$^3$ to 5.0 g/cm$^3$. When the density of each of the partition walls falls within such range, the honeycomb structure can be light-weighted, and besides, the mechanical strength thereof can be made sufficient. The density may be measured by, for example, an Archimedes method.

In at least one embodiment of the present invention, the thickness of the outer peripheral wall 40 is larger than the thickness of each of the partition walls 30. With such configuration, the outer peripheral wall can be suppressed from undergoing a breakage, a fracture, a crack, or the like due to an external force (e.g., an impact from the outside, or a thermal stress due to a temperature difference between an exhaust gas and the outside). The thickness of the outer peripheral wall 40 is, for example, 0.05 mm or more, preferably 0.1 mm or more, more preferably 0.15 mm or more. However, when the outer peripheral wall is made excessively thick, its heat capacity is increased to enlarge a temperature difference between the inner peripheral side of the outer peripheral wall and a partition wall on the inner peripheral side, resulting in a reduction in thermal shock resistance in some cases. In view of this, the thickness of the outer peripheral wall is preferably 1.0 mm or less, more preferably 0.7 mm or less, still more preferably 0.5 mm or less.

The cells 20 each have any appropriate sectional shape in the direction perpendicular to the direction in which the cell extends. In the illustrated example, the partition walls 30 defining the cells are perpendicular to each other to define the cells 20 each having a sectional shape that is a tetragon (square) except in parts in contact with the outer peripheral wall 40. The sectional shape of each of the cells 20 may be a shape other than the square, such as a triangle, a pentagon, a hexagon, or a higher polygon. The sectional shape of each of the cells is preferably a tetragon or a hexagon. With such configuration, there is an advantage in that the pressure loss at the time of the flowing of an exhaust gas is small, resulting in excellent purification performance.

A cell density in the direction perpendicular to the direction in which the cells 20 extend (i.e., the number of the cells 20 per unit area) may be appropriately set in accordance with purposes. The cell density is preferably from 4 cells/cm$^2$ to 150 cells/cm$^2$, more preferably from 50 cells/cm$^2$ to 150 cells/cm$^2$, still more preferably from 70 cells/cm$^2$ to 100 cells/cm$^2$. When the cell density falls within such ranges, the strength and effective geometric surface area (GSA, i.e., catalyst supporting area) of the honeycomb structure can be sufficiently secured, and besides, the pressure loss at the time of the flowing of an exhaust gas can be suppressed.

A-2. Production Method for Honeycomb Structure

The honeycomb structure may be produced by any appropriate method. A typical example thereof is described below.

First, metal silicon powder, a binder, a surfactant, a pore former, water, and the like are added to silicon carbide powder to prepare a forming raw material. As described in the section A-1, the metal silicon powder may be blended at preferably from 10 mass % to 40 mass % with respect to the sum of the mass of the silicon carbide powder and the mass of the metal silicon powder. As described in the section A-1, the average particle diameter of silicon carbide particles in the silicon carbide powder is preferably from 3 μm to 50 μm. The average particle diameter of metal silicon particles in the metal silicon powder is preferably from 2 μm to 35 μm. When the average particle diameter of the metal silicon particles is excessively small, the volume resistivity of the honeycomb structure to be obtained becomes excessively low in some cases. When the average particle diameter of the metal silicon particles is excessively large, the volume resistivity of the honeycomb structure to be obtained becomes excessively high in some cases. The total content of the silicon carbide powder and the metal silicon powder may be appropriately set in accordance with the configuration desired of the honeycomb structure to be obtained. The total content is preferably from 30 mass % to 78 mass % with respect to the mass of the entirety of the forming raw material. The average particle diameter of the metal silicon particles may be measured by, for example, a laser diffraction method.

Examples of the binder include methyl cellulose, hydroxypropoxyl cellulose, hydroxyethyl cellulose, carboxymethyl cellulose, and polyvinyl alcohol. Of those, methyl cellulose and hydroxypropoxyl cellulose are preferably used in combination. The content of the binder may also be appropriately set in accordance with the configuration desired of the honeycomb structure to be obtained. The content of the binder is preferably from 2 parts by mass to 10 parts by mass with respect to 100 parts by mass of the total mass of the silicon carbide powder and the metal silicon powder.

Examples of the surfactant include ethylene glycol, a dextrin, a fatty acid soap, and a polyalcohol. Those surfactants may be used alone or in combination thereof. The content of the surfactant may also be appropriately set in accordance with the configuration desired of the honeycomb structure to be obtained. The content of the surfactant is preferably from 0.1 part by mass to 2 parts by mass with respect to 100 parts by mass of the total mass of the silicon carbide powder and the metal silicon powder.

Any appropriate material may be used as the pore former as long as the material disappears to form pores through firing. Examples of the pore former include graphite, starch, resin balloons, a water-absorbing resin, and silica gel. The content of the pore former may also be appropriately set in accordance with the configuration desired of the honeycomb structure to be obtained. The content of the pore former is preferably from 0.5 part by mass to 10 parts by mass with respect to 100 parts by mass of the total mass of the silicon carbide powder and the metal silicon powder. The average particle diameter of the pore former is preferably from 10 μm to 30 μm. When the average particle diameter of the pore former is excessively small, pores cannot be sufficiently formed in some cases. When the average particle diameter of the pore former is excessively large, the die is clogged with the forming raw material at the time of forming in some cases. The average particle diameter of the pore former may be measured by, for example, a laser diffraction method.

The content of the water may also be appropriately set in accordance with the configuration desired of the honeycomb structure to be obtained. The content of the water is preferably from 20 parts by mass to 60 parts by mass with respect to 100 parts by mass of the total mass of the silicon carbide powder and the metal silicon powder.

Next, the forming raw material is kneaded to form a kneaded material. Any appropriate device/mechanism may be adopted as kneading means. Specific examples thereof include a kneader and a vacuum clay kneader.

Next, the kneaded material is extruded to form a honeycomb formed body. In the extrusion, there may be used a die having a configuration corresponding to the desired overall shape, cell shape, partition wall thickness, cell density, and the like of the honeycomb structure. For example, a wear-resistant cemented carbide may be used as a material for the die. The partition wall thickness, cell density, outer peripheral wall thickness, and the like of the honeycomb formed body (i.e., the configuration of the die) may be appropriately set in accordance with the desired configuration of the honeycomb structure to be obtained in consideration of shrinkage in drying and firing to be described later.

Next, the honeycomb formed body is dried to provide a honeycomb dried body. Any appropriate method may be used as a method for the drying. Specific examples thereof include: an electromagnetic wave heating system, such as microwave heat-drying or dielectric heat-drying (e.g., high-frequency dielectric heat-drying); and an external heating system, such as hot air drying or superheated steam drying. In at least one embodiment of the present invention, two-step drying may be performed. The two-step drying includes drying out a certain amount of water by the electromagnetic wave heating system, and then drying out the remaining water by the external heating system. According to such two-step drying, the entire formed body can be rapidly and uniformly dried in such a manner as not to cause a crack. More specifically, the two-step drying includes removing 30 mass % to 99 mass % of water with respect to the water content of the honeycomb formed body before drying by the electromagnetic wave heating system, and then reducing the water content of the honeycomb dried body to 3 mass % or less by the external heating system. The electromagnetic wave heating system is preferably dielectric heat-drying, and the external heating system is preferably hot air drying.

Next, the honeycomb dried body is fired to provide a honeycomb fired body. In at least one embodiment of the present invention, calcination may be performed before the firing. When the calcination is performed, the binder and the like can be satisfactorily removed. The calcination may be performed, for example, in an ambient air atmosphere at from 400° C. to 500° C. for from 0.5 hour to 20 hours. The firing may be performed, for example, in an inert atmosphere of nitrogen, argon, or the like at from 1,400° C. to 1,500° C. for from 1 hour to 20 hours. The calcination and the firing may be performed using any appropriate means. The calcination and the firing may be performed using, for example, an electric furnace or a gas furnace.

Finally, the honeycomb fired body is subjected to heating treatment to form an oxide film on the silicon surface and/or to form cristobalite in the structure. Thus, the honeycomb structure is obtained. The conditions of the heating treatment are as described in the section A-1.

B. Electric Heating Support

An electric heating support 200 of the illustrated example includes the honeycomb structure 100 and a pair of electrode layers 120 and 120 arranged on the outer periphery of the honeycomb structure 100 (typically so as to be opposed to each other across the central axis of the honeycomb structure). Metal terminals (not shown) are respectively connected to the electrode layers 120 and 120. One of the metal terminals is connected to the positive pole of a power source (e.g., a battery), and the other metal terminal is connected to the negative pole of the power source (e.g., the battery).

The electrode layers each extend over, for example, 80% or more of the length between both end surfaces of the honeycomb structure 100, preferably 90% or more of the length, more preferably the entire length. Such configuration has an advantage in that the spread of current in the axial direction of each of the electrode layers is facilitated.

The thickness of each of the electrode layers is preferably from 0.01 mm to 5 mm, more preferably from 0.01 mm to 3 mm. When the thickness is set to fall within such ranges, heat generation uniformity can be enhanced. The thickness of each of the electrode layers is defined as a thickness in a normal direction with respect to a tangent line of the outer surface of the electrode layer at a site where the thickness is to be measured in the observation of the measurement site in a section perpendicular to the extension direction of the cells.

When the volume resistivity of each of the electrode layers is set to be lower than the volume resistivity of the honeycomb structure, it becomes easy for electricity to preferentially flow through the electrode layers, which facilitates the spread of electricity in the flow path direction of the cells and circumferential direction at the time of energization. The volume resistivity of each of the electrode layers is, for example, preferably 1/200 or more and 1/10 or less, more preferably 1/100 or more and 1/20 or less of the volume resistivity of the honeycomb structure. The volume resistivity of each of the electrode layers is a value measured at 25° C. by a four-terminal method.

As a material for each of the electrode layers, there may be used conductive ceramics, a metal, or a composite material (cermet) of a metal and conductive ceramics. Examples of the metal include: an elemental metal of Cr, Fe, Co, Ni, Si, or Ti; and an alloy containing at least one kind of metal selected from the group consisting of those metals. Examples of the conductive ceramics include, but not limited to, silicon carbide (SiC), and metal compounds including metal silicides, such as tantalum silicide ($TaSi_2$) and chromium silicide ($CrSi_2$). Specific examples of the composite material (cermet) of a metal and conductive ceramics include: a composite material of metal silicon and silicon carbide; a composite material of a metal silicide, such as tantalum silicide or chromium silicide, metal silicon, and silicon carbide; and a composite material obtained by adding one kind or two or more kinds of insulating ceramics, such as alumina, mullite, zirconia, cordierite, silicon nitride, and aluminum nitride, to one kind or two or more kinds of the above-mentioned metals from the viewpoint of reducing thermal expansion.

The metal terminals may be a pair of metal terminals arranged so that one of the metal terminals is opposed to the other metal terminal across the central axis of the honeycomb structure. When a voltage is applied via the electrode layers, the metal terminals can be energized to cause, with Joule heat, the honeycomb structure to generate heat. Accordingly, the electric heating support can also be suitably used as a heater. The voltage to be applied may be appropriately set in accordance with purposes and the like. The voltage to be applied is preferably from 12 V to 900 V, more preferably from 48 V to 600 V.

A material for each of the metal terminals is not particularly limited as long as the material is a metal, and for example, an elemental metal and an alloy may each be adopted. From the viewpoints of corrosion resistance, an electrical resistivity, and a linear expansion coefficient, for example, an alloy containing at least one kind selected from the group consisting of Cr; Fe; Co; Ni; and Ti is preferred, and stainless steel and an Fe—Ni alloy are more preferred.

In the electric heating support 200, a catalyst may be typically supported by the partition walls 30 of the honeycomb structure 100. When the catalyst is supported by the partition walls, CO, $NO_x$, a hydrocarbon, and the like in the exhaust gas can be formed into harmless substances through a catalytic reaction in the case where the exhaust gas is flowed through the cells 20. The catalyst may preferably contain a noble metal (e.g., platinum, rhodium, palladium, ruthenium, indium, silver, or gold), aluminum, nickel, zirconium, titanium, cerium, cobalt, manganese, zinc, copper, tin, iron, niobium, magnesium, lanthanum, samarium, bismuth, barium, and a combination thereof. Any such element may be contained as an elemental metal, a metal oxide, or any other metal compound. The supported amount of the catalyst may be, for example, from 0.1 g/L to 400 g/L.

In the electric heating support 200, when a voltage is applied to the honeycomb structure 100, the honeycomb structure can be energized to generate heat with Joule heat. Thus, the catalyst supported by the honeycomb structure (substantially, the partition walls) can be heated to the activating temperature before the start of the engine or at the start of the engine. As a result, the exhaust gas can be sufficiently treated (typically, purified) even at the start of the engine. According to at least one embodiment of the present invention, as described in the section A, an increase in resistance of the honeycomb structure under a high-temperature oxidizing atmosphere can be suppressed, and besides, the thermal expansion coefficient of the honeycomb structure can be reduced. As a result, the electric heating support can maintain stable exhaust gas treatment (typically purification) performance over a long period of time, and can also suppress, for example, a breakage, a fracture, and a crack in the honeycomb structure even when the engine is repeatedly started and stopped.

The electric heating support is typically housed in any appropriate tubular member to form an exhaust gas treatment device. The exhaust gas treatment device is typically installed in the middle of an exhaust gas flow path through which an exhaust gas from an engine of an automobile is to be flowed.

EXAMPLES

Now, the present invention is specifically described by way of Examples. However, the present invention is not limited to these Examples. Evaluation items in Examples are as described below.

(1) Thickness of Oxide Film

An image of the inside of a partition wall or an outer peripheral wall of a honeycomb structure obtained in each of Examples and Comparative Examples was captured with a scanning electron microscope (SEM). A site at which the silicon element (Si) and the oxygen element (O) were found on a Si surface by SEM-EDX was identified as an oxide film, and its thickness was determined.

(2) Determination of Cristobalite Amount

The amount of cristobalite was measured in the following manner. An X-ray diffraction pattern of an oxide film was obtained using an X-ray diffraction apparatus (manufactured by Bruker AXS GmbH, D8 ADVANCE). (Main measurement conditions: CuKα characteristic X-ray, bulb voltage: 10 kV, bulb current: 20 mA, diffraction angle 2θ=5° to 100°). Next, through use of analysis software TOPAS (manufactured by Bruker AXS GmbH), the resultant X-ray diffraction data was analyzed by a Rietveld method to quantify the diffraction line peak intensity of cristobalite.

(3) Rate of Increase in Resistance

A test sample was cut out of the honeycomb structure obtained in each of Examples and Comparative Examples. A volume resistivity $R_0$ of the cut-out test sample was measured. The test sample was subjected to an endurance test at 950° C. in a water vapor atmosphere for 250 hours, and a volume resistivity $R_{250}$ of the test sample after the test was measured. A ratio $R_{250}/R_0$ was defined as a rate of increase in resistance (unitless).

(4) Thermal Expansion Coefficient

A test sample measuring 3 mm vertical by 3 mm horizontal by 20 mm long was cut out of the honeycomb structure obtained in each of Examples and Comparative Examples. The test sample was measured for its average coefficient of linear thermal expansion (thermal expansion coefficient) in the range of from 40° C. to 800° C. in the length direction of the test sample in conformity with JIS R1618:2002.

(5) Strength/Young's Modulus Ratio

A test sample measuring 3 mm vertical by 4 mm horizontal by 70 mm long was cut out of the honeycomb structure obtained in each of Examples and Comparative Examples. The test sample was measured for its Young's modulus E (GPa) at room temperature in conformity with JIS R1602. In addition, the sample that had been measured for its Young's modulus was measured for its four-point bending strength σ (MPa) at room temperature in conformity with JIS R1601. A ratio σ/E was defined as a strength/Young's modulus ratio. The resultant strength/Young's modulus ratio σ/E was ranked by the following criteria.

AA: The ratio σ/E is 0.65 or more and 0.85 or less.
A: The ratio σ/E is 0.45 or more and less than 0.65.

(6) Thermal Shock Resistance

A heating-cooling test of a honeycomb structure was performed using a propane gas burner tester including a metal case for housing a honeycomb structure and a propane gas burner capable of supplying a heated gas into the metal case. The heated gas was a combustion gas generated by burning a propane gas with the gas burner (propane gas burner). In addition, thermal shock resistance was evaluated by determining whether or not a crack occurred in the honeycomb structure according to the heating-cooling test. Specifically, first, the obtained honeycomb structure was housed (canned) in the metal case of the propane gas burner tester. Then, a gas heated by the propane gas burner (combustion gas) was supplied into the metal case so as to pass through the inside of the honeycomb structure. The temperature conditions (inlet gas temperature conditions) of the heated gas flowing into the metal case were set as described below. The temperature was increased to a specified temperature in 5 minutes, kept at the specified temperature for 10 minutes, then cooled to 100° C. in 5 minutes, and kept at 100° C. for 10 minutes. Such series of operations involving temperature increase, cooling, and keeping is referred to as "temperature increase and cooling operation." After that, the presence or absence of a crack in the honeycomb structure was determined. Then, the "temperature increase and cooling operation" was repeated while the specified temperature was increased from 825° C. in increments of 25° C. The thermal shock resistance of the honeycomb structure was evaluated on the basis of the following evaluation criteria.

Rank AA: No crack occurs at a specified temperature of 1,000° C.

Rank A: No crack occurs at a specified temperature of from 950° C. to 975° C., and a crack occurs at 1,000° C.

Rank B: No crack occurs at a specified temperature of from 900° C. to 925° C., and a crack occurs at 950° C.

Example 1

Silicon carbide powder and metal silicon powder were mixed at a mass ratio of 75:25 to prepare a ceramics raw material. To the ceramics raw material, hydroxypropyl methylcellulose serving as a binder and a water-absorbing resin serving as a pore former were added, and water was also added to prepare a forming raw material. The forming raw material was kneaded with a vacuum clay kneader to produce a cylindrical kneaded material. The content of the binder was set to 8 parts by mass with respect to 100 parts by mass in total of the silicon carbide powder and the metal silicon powder. The content of the pore former was set to 3 parts by mass with respect to 100 parts by mass in total of the silicon carbide powder and the metal silicon powder. The content of the water was set to 31 parts by mass with respect to 100 parts by mass in total of the silicon carbide powder and the metal silicon powder. The average particle diameter of the silicon carbide powder was 20 μm.

The resultant kneaded material was extruded so as to finally have a hexagonal cell structure. The resultant honeycomb formed body was subjected to high-frequency dielectric heat-drying, and then dried with a hot-air dryer at 120° C. for 2 hours, followed by processing into predetermined external dimensions. Thus, a honeycomb dried body was obtained.

The resultant honeycomb dried body was fired in an Ar atmosphere at 1,450° C. for 0.5 hour to produce a cylindrical honeycomb fired body. The resultant honeycomb fired body was subjected to heating treatment at 950° C. for 50 hours under a water vapor atmosphere to provide a honeycomb structure.

The resultant honeycomb structure had end surfaces each having a circular shape with an outer diameter (diameter) of 80 mm, and had a height (length in the flow path direction of cells) of 80 mm, and the thickness of its outer peripheral wall was 0.5 mm. Its cell density was 93 cells/cm², the thickness of its partition walls was 150 µm, the porosity of the partition walls was 40%, and the average pore diameter of the partition walls was 8 µm. The resultant honeycomb structure had an oxide film having a thickness of 0.39 µm formed on the silicon surface of the silicon carbide-silicon composite material. In addition, the cristobalite amount in the resultant honeycomb structure was 2.2 mass %. The resultant honeycomb structure was subjected to the evaluations (3) to (5). The results are shown in Table 1.

Examples 2 to 12 and Comparative Example 1

For Examples 2 to 8, 11, and 12, and Comparative Example 1, honeycomb structures were obtained in the same manner as in Example 1 except that the honeycomb fired body was subjected to heating treatment under conditions shown in Table 1. For Examples 9 and 10, honeycomb structures were obtained in the same manner as in Example 1 except that: the honeycomb fired body was subjected to heating treatment under conditions shown in Table 1; and the porosity of the honeycomb structure was increased as compared to Example 1 by controlling the amount of the pore former. The thicknesses of oxide films and cristobalite contents in the resultant honeycomb structures were as shown in Table 1. The resultant honeycomb structures were subjected to the same evaluations as in Example 1. The results are shown in Table 1.

Comparative Example 2

A honeycomb structure was obtained in the same manner as in Example 1 except that the honeycomb fired body was not subjected to heating treatment. The thickness of an oxide film and cristobalite content in the resultant honeycomb structure were as shown in Table 1. The resultant honeycomb structure was subjected to the same evaluations as in Example 1. The results are shown in Table 1.

besides, the thermal expansion coefficient of the honeycomb structure can be reduced. Further, as is apparent from a comparison between Examples 1 to 5 and Examples 6 to 8, it is found that the above-mentioned characteristics tend to be further improved by setting the temperature of the heating treatment to a low temperature and setting the time of the heating treatment to a long period of time. More specifically, in Examples 1 to 5, while the rate of increase in resistance of the honeycomb structure after the heating-cooling endurance test is suppressed to fall within the acceptable range, the thermal expansion coefficient of the honeycomb structure can be extremely reduced. Meanwhile, in Examples 6 to 8, although the rate of increase in resistance can be satisfactorily suppressed, the thermal expansion coefficient is not sufficiently reduced, and the thermal shock resistance may become insufficient depending on the heating treatment conditions. Besides, as is apparent from Examples 11 and 12, when the heating treatment is performed at a high temperature for a long period of time, the cristobalite content in the honeycomb structure can be remarkably increased, with the result that the rate of increase in resistance can be remarkably suppressed, and besides, the strength/Young's modulus ratio can be made satisfactory. In addition, as is apparent from a comparison between Example 4 (small porosity) and Example 10 (large porosity), and a comparison between Example 8 (small porosity) and Example 9 (large porosity), the strength/Young's modulus ratio can be made satisfactory by increasing the porosity even when the heating treatment is performed under the same conditions.

The honeycomb structure according to at least one embodiment of the present invention and the electric heating support using the same can be suitably used for the treatment (purification) of an exhaust gas from an automobile.

According to at least one embodiment of the present invention, the honeycomb structure excellent in balance

TABLE 1

| | Heating treatment | | | Oxide film thickness (µm) | Cristobalite amount (mass %) | Rate of increase in resistance | Thermal expansion coefficient (ppm/K) | Strength/Young's modulus ratio | Thermal shock resistance |
|---|---|---|---|---|---|---|---|---|---|
| | Temperature (° C.) | Time (h) | Atmosphere | | | | | | |
| Example 1 | 950 | 50 | Water vapor | 0.39 | 2.2 | 1.94 | 4.27 | A | AA |
| Example 2 | 1,000 | 30 | Water vapor | 0.41 | 3.2 | 1.87 | 4.34 | A | AA |
| Example 3 | 950 | 50 | Ambient air | 0.15 | 1.6 | 2.01 | 4.23 | A | AA |
| Example 4 | 1,050 | 6 | Ambient air | 0.15 | 1.8 | 1.85 | 4.22 | A | AA |
| Example 5 | 1,150 | 1 | Ambient air | 0.17 | 2.7 | 1.72 | 4.34 | A | AA |
| Example 6 | 1,250 | 0.5 | Ambient air | 0.28 | 5.0 | 1.53 | 4.47 | A | A |
| Example 7 | 1,250 | 1 | Ambient air | 0.22 | 5.1 | 1.57 | 4.46 | A | A |
| Example 8 | 1,250 | 6 | Ambient air | 0.40 | 7.3 | 1.50 | 4.59 | A | A |
| Example 9 | 1,250 | 6 | Ambient air | 0.40 | 8.5 | 1.70 | 4.69 | AA | AA |
| Example 10 | 1,050 | 6 | Ambient air | 0.15 | 2.0 | 2.15 | 4.28 | AA | AA |
| Example 11 | 1,250 | 40 | Ambient air | 0.90 | 13.2 | 1.3 | 5.00 | AA | A |
| Example 12 | 1,250 | 80 | Ambient air | 1.20 | 17.8 | 1.1 | 5.30 | AA | A |
| Comparative Example 1 | 1,300 | 1 | Ambient air | 0.40 | 6.4 | 1.48 | 4.70 | A | B |
| Comparative Example 2 | | | Absent | 0.00 | 0.00 | 2.25 | 4.17 | A | AA |

*"0.00" means being below a detection limit.

As is apparent from Table 1, when an oxide film having a predetermined thickness is formed on the silicon surface of the silicon carbide-silicon composite material forming the honeycomb structure and/or the cristobalite content in the honeycomb structure is set to be equal to or higher than a predetermined value, the rate of increase in resistance of the honeycomb structure after the heating-cooling endurance test can be suppressed to fall within an acceptable range, and between oxidation resistance and thermal shock resistance under a high-temperature environment can be achieved.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. An electric heating support, comprising:
a honeycomb structure comprising partition walls defining cells each extending from a first end surface of the honeycomb structure to a second end surface thereof to form a fluid flow path; and an outer peripheral wall,
a pair of electrode layers arranged on an outer surface of the outer peripheral wall so as to be opposed to each other across central axis of the honeycomb structure; and
a pair of metal terminals connected to the pair of electrode layers;
wherein the partition walls and the outer peripheral wall are each formed of ceramics containing silicon carbide and metal silicon, and
wherein a surface of the metal silicon has formed thereon an oxide film having a thickness of from 0.1 μm to 5.0 μm.

2. An electric heating support, comprising:
a honeycomb structure comprising partition walls defining cells each extending from a first end surface of the honeycomb structure to a second end surface thereof to form a fluid flow path; and an outer peripheral wall,
a pair of electrode layers arranged on an outer surface of the outer peripheral wall so as to be opposed to each other across a central axis of the honeycomb structure; and
a pair of metal terminals connected to the pair of electrode layers;
wherein the partition walls and the outer peripheral wall are each formed of ceramics containing silicon carbide and metal silicon, and
wherein the honeycomb structure has a content of cristobalite of 1.0 mass % or more.

3. The electric heating support according to claim 1, wherein the honeycomb structure has a thermal expansion coefficient of from 4.00 ppm/K to 5.30 ppm/K.

4. The electric heating support according to claim 3, wherein the thermal expansion coefficient of the honeycomb structure is from 4.00 ppm/K to 4.60 ppm/K.

5. The electric heating support according to claim 4, wherein the thermal expansion coefficient of the honeycomb structure is from 4.20 ppm/K to 4.35 ppm/K.

6. The electric heating support according to claim 1,
wherein the thickness of the oxide film is from 0.1 μm to 0.2 μm, and
wherein the honeycomb structure has a thermal expansion coefficient of from 4.20 ppm/K to 4.35 ppm/K.

7. The electric heating support according to claim 2,
wherein the content of the cristobalite is from 1.5 mass % to 3.5 mass %, and
wherein the honeycomb structure has a thermal expansion coefficient of from 4.20 ppm/K to 4.35 ppm/K.

8. The electric heating support according to claim 2, wherein the honeycomb structure has a thermal expansion coefficient of from 4.00 ppm/K to 5.30 ppm/K.

9. The electric heating support according to claim 8, wherein the thermal expansion coefficient of the honeycomb structure is from 4.00 ppm/K to 4.60 ppm/K.

10. The electric heating support according to claim 9, wherein the thermal expansion coefficient of the honeycomb structure is from 4.20 ppm/K to 4.35 ppm/K.

11. An electric heating support, comprising:
a honeycomb structure comprising partition walls defining cells each extending from a first end surface of the honeycomb structure to a second end surface thereof to form a fluid flow path; and an outer peripheral wall,
a pair of electrode layers arranged on an outer surface of the outer peripheral wall so as to be opposed to each other across a central axis of the honeycomb structure; and
a pair of metal terminals connected to the pair of electrode layers;
wherein the partition walls and the outer peripheral wall are each formed of ceramics containing silicon carbide and metal silicon,
wherein a surface of the metal silicon has formed thereon an oxide film having a thickness of from 0.1 μm to 1.2 μm,
wherein the honeycomb structure has a content of cristobalite of from 1.0 mass % to 17.8 mass %,
wherein the honeycomb structure has a thermal expansion coefficient of from 4.00 ppm/K to 5.30 ppm/K, and
wherein the honeycomb structure has a rate of increase in resistance of 2.15 or less after an endurance test at 950° C. in a water vapor atmosphere for 250 hours.

* * * * *